United States Patent
Cockerham et al.

(10) Patent No.: US 7,386,840 B1
(45) Date of Patent: Jun. 10, 2008

(54) METHOD, APPARATUS, AND PROGRAM FOR SOURCE CODE TRANSLATION FROM COBOL TO OBJECT-ORIENTED CODE

(75) Inventors: Robert M. Cockerham, Roswell, GA (US); Patrick M. Kane, Loganville, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 567 days.

(21) Appl. No.: 10/936,911

(22) Filed: Sep. 9, 2004

(51) Int. Cl.
*G06F 9/45* (2006.01)

(52) U.S. Cl. .............. 717/137; 717/148; 717/159; 717/166

(58) Field of Classification Search .............. 717/137
See application file for complete search history.

(56) References Cited

U.S. PATENT DOCUMENTS

| | | | | |
|---|---|---|---|---|
| 5,778,232 A | * | 7/1998 | Caldwell et al. ............ | 717/136 |
| 5,819,276 A | * | 10/1998 | Cai et al. .................... | 707/100 |
| 6,002,874 A | * | 12/1999 | Bahrs et al. ................. | 717/157 |
| 6,151,702 A | * | 11/2000 | Overturf et al. ............ | 717/136 |
| 6,212,677 B1 | * | 4/2001 | Ohkubo et al. ............. | 717/143 |
| 6,230,117 B1 | * | 5/2001 | Lymer et al. ................ | 703/22 |
| 6,269,474 B1 | | 7/2001 | Price | |
| 6,453,464 B1 | * | 9/2002 | Sullivan ..................... | 717/137 |
| 6,467,079 B1 | * | 10/2002 | Ettritch et al. .............. | 717/108 |
| 6,523,171 B1 | * | 2/2003 | Dupuy et al. ............... | 717/136 |
| 6,526,569 B1 | * | 2/2003 | Obin et al. ................. | 717/140 |
| 6,698,014 B1 | * | 2/2004 | Rechter ..................... | 717/137 |
| 7,043,693 B2 | * | 5/2006 | Wenzel et al. .............. | 715/763 |
| 7,120,876 B2 | * | 10/2006 | Washington et al. ........ | 715/763 |

* cited by examiner

*Primary Examiner*—Tuan Q. Dam
*Assistant Examiner*—Evral Bodden
(74) *Attorney, Agent, or Firm*—Christine Q. McLeod; Beusse Wolter Sanks Mora & Maire

(57) ABSTRACT

A method, apparatus, and program for translating source code programs from COBOL into an object-oriented language and then utilize an "object" that emulates the COBOL's Working-Storage Section. By emulating the Working-Storage Section in an object-oriented program, the object-oriented program source code can closely resemble the original COBOL source code as well as have a very clean syntax. This allows it to be kept in a highly maintainable and readable form after translation.

24 Claims, 4 Drawing Sheets

METHOD, APPARATUS, AND PROGRAM FOR SOURCE CODE TRANSLATION FROM COBOL TO OBJECT-ORIENTED CODE

TECHNICAL FIELD

The present invention relates to source code translators. More specifically, the invention relates to a method, apparatus, and program for translating COBOL (Common Business Oriented Language) source code programs into object-oriented language programs, while maintaining the readability, structure, and functionality of COBOL.

BACKGROUND ART

COBOL is believed to be still one of the most widely used programming languages. It is a high-level programming language designed for business data processing. When COBOL was developed, one of the design goals was to make it as English-like as possible. As a result, COBOL uses structural concepts normally associated with English prose such as section, paragraph and sentence. However, as computer programs have become more complex, today's programming languages have become "object-oriented" to reduce the complexity of the programming process. For example, C++, an object-oriented extension of the C language, has achieved widespread acceptance today.

There is a need to gain the advantages of object-oriented programming that modern software provides yet still not lose the benefits of the large base of legacy COBOL code that has already been written. One method to accomplish this is a source code language translator. However, due to the inherent differences in the data structures of COBOL and object-oriented languages such as C++, the code that is generated by current source code translators is disorganized, hard to read, and difficult to maintain. A number of patents and published applications exist which relate to source code translators, including, U.S. Pat. Nos. 6,002,874, 6,269,474, 6,453,464, 6,467,079, 6,523,171, and 6,526,569; all of which are incorporated herein by reference in their entirety to the extent they are not inconsistent with the explicit teachings of this specification.

COBOL's unique English-like structure can be seen in its organized divisions. Specifically, a typical COBOL program consists of four divisions: Identification Division, Environment Division, Data Division, and Procedure Division. The Identification Division is used mostly for documentation. It contains paragraphs specifying the program name and optionally author, date and other information. The Environment division contains information linking the logical file and device names used in the program with their physical counterparts. The Data Division contains the definitions, data-names for all file, record, group and single data items, and (optionally) initial values for them. All data-names referenced in the program must be defined in this division. All control and logical instructions for the program are contained in the Procedure Division. It normally consists of a series of paragraphs/procedures, each of which performs a logical function. The two divisions we are mainly concerned with here are: (1) the Data Division for data and (2) the Procedure Division for instructions that operate on the data. In object-oriented programs, however, structures which include data and the code operating on that data are combined into "objects". Manipulations of the internal data of the object are carried out by executing member functions of the object.

Specifically, the Procedure Division in a COBOL program contains the statements (instructions) that convert input data into output. Statements are either action statements (those that perform a specific processing action) or control statements (those that determine the sequence in which statements are executed). Statements are organized into named paragraphs/procedures, each of which is designed to perform a specific task. In a COBOL program, execution begins with the first statements in the first paragraph of the Procedure Division. The first paragraph is generally referred to as the "main module". The main module provides the top-level logic flow-of-control for the program as a whole. Program execution should both begin and end in the main module. Other paragraphs are invoked as needed, and may themselves invoke other paragraphs, in a hierarchical fashion.

The Data Division is an important division in a COBOL program. The Data Division defines all input and output data structures, as well as those used internally for data manipulation and program control. There are two sections of the Data Division common to most COBOL programs: the File Section that defines file I/O (input/output) buffer areas and the Working-Storage Section where internal data structures are defined. There is optionally a third section called the Linkage Section which is the same as the Working-Storage Section but specifies the data structures which may be used to pass data from one COBOL program to another.

COBOL data items are references to memory locations that can hold a value that may change during program execution. Every data item must be assigned a name, type, and length in the Data Division. The Working-Storage section is used to define data-names not associated with an input/output buffer area (a file description). These data-names are commonly those required for temporary data storage, calculations and switches for program control. Both group and single items can be defined, each with an associated type and length. In addition, an initial value can optionally be assigned to each single item with a COBOL 'VALUE' clause.

One difficulty of source code translation of COBOL programs arises with respect to references to variables. COBOL provides a consistent way of referencing variables regardless if it's a group variable or single variable. COBOL can access variables with a single data-name, while most modern languages will use a single data-name (or variable name) to access a single variable but will have to use multiple data-names to access a single variable if it exists inside of a group variable (or data structure). Each level of grouping requires another data-name to be specified when accessing the single internal variable. Many source code translators translate variables from COBOL to C on a 'one-for-one' basis and therefore have to compensate for the syntax differences thus losing COBOL's simplicity.

For example, in one-to-one translation, COBOL data structures become C language 'struct's and COBOL 'REDEFINES' become C language 'union's. In addition, when a COBOL data structure of strings is translated into a C language 'struct' data structure, C functions like 'memcpy( )' and 'memset( )' are called upon to access the data because normal strings in C are null-terminated and in COBOL they are not. The resulting code is so different from the original that the ability to read and understand the intention of the initial COBOL programming becomes unduly difficult and may be lost.

In addition, many of the existing 'COBOL to C++' Translators are really 'COBOL to C' Translators. While the output produced can be compiled with a C++ compiler they do not utilize any of the extensions provided by C++. These translators are not really producing C++ code, but are producing C code.

It is a well-known feature of object-oriented languages that classes can be used to create new data types. While some source code translators create or use object classes that emulate individual variable types, they do not use an object class that emulates the entire COBOL's Working-Storage Section and therefore produces code that is much more difficult to read and understand than the original code.

Accordingly, there is a need in the art to create a method for translating COBOL source code to source code of an object-oriented language such as C++ that will result in code with the advantages of being object-oriented and still maintain the readability, structure, and functionality of the original COBOL program.

The present invention is designed to address these needs.

SUMMARY OF THE INVENTION

Broadly speaking, the invention provides a method, apparatus, and program for translating source code programs from COBOL into an object-oriented language and then utilize an "object" that emulates the COBOL's Working-Storage Section.

The invention can be implemented in numerous ways, as a system (including a computer processing system), as a method (including a computerized method), as an apparatus, as a computer readable medium, a computer program product, or as a data structure tangibly fixed in a computer readable memory. Several embodiments of the invention are discussed below.

As a method, an embodiment of the invention includes a method for translating COBOL programs into programs using an object-oriented (OO) programming language. The method includes separately translating the Working-Storage Section and the Procedure Division of COBOL source code into a new object class that is a child of ("is derived from" in OO terms) an "object" that emulates the COBOL's Working-Storage Section.

The method of the present invention may be implemented as a computer program product with a computer-readable medium having code thereon. The program product includes a program and a signal bearing media bearing the program. As a computer system, an embodiment of the invention includes code devices executed by a processor of a computer system for translating COBOL into programs using object-oriented programming language. The code devices execute the methods of the invention.

As an apparatus, the present invention may include at least one processor, a memory coupled to the processor, and a program residing in the memory which implements the methods of the present invention. As a computer readable medium containing program instructions for translating COBOL into programs using object-oriented programming language, an embodiment of the invention includes computer readable code devices for implementing the methods of the present invention. The invention may also be implemented as computer executable software code.

Specifically, in an embodiment, the invention comprises a method of creating in an object-oriented program an object class that emulates a Working Storage section of a COBOL program, by creating a base class in object-oriented source code, the base class having functions for creating a memory buffer to store variables representative of the COBOL's Working-Storage section and for accessing the memory buffer. The functions for creating a memory buffer include code for validating a list of variable descriptions representative of the COBOL's Working-Storage section, calculating a starting position in the memory buffer for each variable description, accumulating the length of the memory buffer, allocating the memory buffer, and initializing the memory buffer. The functions for accessing the memory buffer include code for retrieving variables from the memory buffer, storing variables in the memory buffer.

The invention also includes a method of emulating in an object-oriented program a COBOL Working-Storage section, by (a) creating a child class derived from a base class, wherein the base class comprises functions for creating a memory buffer to store variables representative of the COBOL's Working-Storage section and for accessing the memory buffer; (b) defining enumeration constants to represent the variables of the COBOL's Working-Storage section; (c) creating a list to describe the COBOL variables; (d) calling functions of the base class to create the memory buffer; and (e) calling functions of the base class to access the memory buffer. The list may be implemented as an array of structures and passed to the functions for creating the memory buffer.

The invention also includes a method of translating COBOL source code into an object-oriented source code, by (a) reading in the COBOL source code, including COBOL commands; (b) generating a child class in object-oriented source code, the child class derived from a base class, wherein the base class emulates COBOL's Working-Storage section; (c) generating in object-oriented source code a list of variable descriptions corresponding to the COBOL's Working-Storage section source code; (d) generating in object-oriented source code a function call to the base class, passing in the list of variable descriptions, for creating and initializing the memory buffer; (e) generating in object-oriented source code a member function of the child class for each COBOL procedure identified; and (f) generating in object-oriented source code functions calls to the base class for at least one of the COBOL commands read in.

In another embodiment, the invention includes an object/class in an object-oriented program for emulating COBOL's Working-Storage section, having at least one function for creating a memory buffer to store variables representative of the COBOL's Working-Storage section; and at least one function for accessing the memory buffer.

The invention may also be viewed as an emulated COBOL's Working-Storage section in an object-oriented program, having a memory buffer created from a list, wherein the list describes each of the variables representative of the COBOL's Working-Storage section; and functions to access the memory buffer.

Moreover, the invention includes a program product for translating COBOL source into an object-oriented source code, having a storage medium; and a translator stored in the storage medium, the translator configured to perform the following steps: (a) reading in the COBOL source code, including COBOL commands; (b) generating a child class in object-oriented source code, the child class derived from a base class, wherein the base class emulates COBOL's Working-Storage section; (c) generating in object-oriented source code a list of variable descriptions corresponding to the COBOL's Working-Storage section source code; (d) generating in object-oriented source code a function call to the base class, passing in the list of variable descriptions, for creating and initializing the memory buffer; (e) generating in object-oriented source code a member function of the child class for each COBOL procedure identified; and (f) generating in object-oriented source code functions calls to the base class for at least one of the COBOL commands read in.

Moreover, the invention also includes a program product for emulating in an object-oriented program a COBOL's Working Storage section, having a storage medium; and code stored in the storage medium, the code configured to perform the following steps: reading in the COBOL source code, including COBOL commands; accumulating a list of variable descriptions corresponding to the COBOL's Working-Storage section source code; creating an instant of a class, including functions, that emulates the COBOL's Working-Storage section; calling functions of the class and passing to them the list, for creating and initializing a memory buffer; and calling appropriate function of the class as each COBOL source code command is read in.

BRIEF DESCRIPTION OF THE DRAWINGS

A more particular description of the invention briefly described above will be rendered by reference to specific embodiments thereof, which is illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
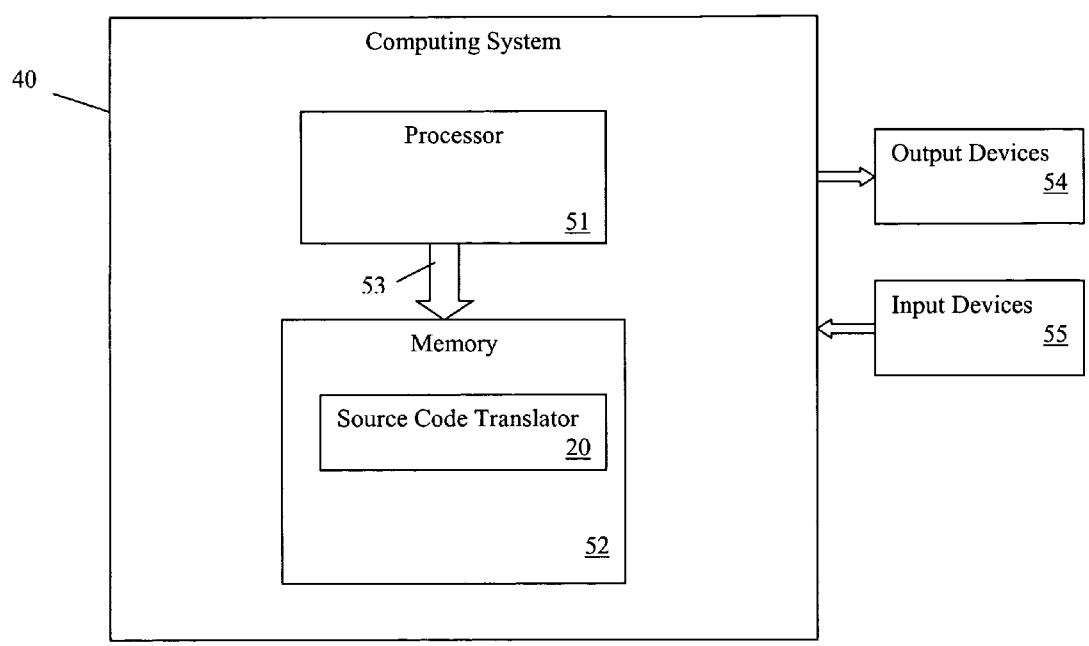
FIG. 1 depicts a block diagram of a computing system in which the present invention may be implemented.

It should be understood that in certain situations for reasons of computational efficiency or ease of maintenance, the ordering and relationships of the blocks of the illustrated flow charts could be rearranged or re-associated by one skilled in the art. While the present invention will be described with reference to the details of the embodiments of the invention shown in the drawings, these details are not intended to limit the scope of the invention.

DETAILED DESCRIPTION

Referring now to the drawings, embodiments of the present invention will be described. Generally speaking, the invention embodies a computer-implemented source code translator designed to convert a COBOL source file/source code file into an object-oriented source file/source code file. The final source file is preferably in C++ programming language.

Referring to FIG. 1, as an example, a computing system 40 in which the present invention may be implemented is shown. Computing system 40 includes a processor 51 and a memory 52 coupled to processor 51 through a bus 53. Processor 51 fetches computer instructions from memory 52 and executes those instructions. Processor 51 also reads data from and writes data to memory 52, sends data and control signals to one or more computer output devices 54, receives data and control signals from one or more computer input devices 55 in accordance with the computer instructions.

Memory 52 can include any type of computer memory including, without limitation, random access memory (RAM), read-only memory (ROM), and storage devices that include storage media such as magnetic and/or optical disks. Memory 52 includes computer software, such as a source code translator 20 of the present invention. The computer software includes a collection of computer instructions and/or data that collectively define tasks performed by computer system 40.

Computer output devices 54 can include any type of computer output device, such as a printer or a display for displaying the graphical and textual information. Each of computer output devices 54 receives from processor 51 control signals and data and, in response to such control signals, displays the received data.

User input devices 55 can include any type of user input device such as a keyboard, or keypad, or a pointing device, such as an electronic mouse, a trackball, a light pen, a touch-sensitive pad, a digitizing tablet, thumb wheels, or a joystick. Each of user input devices 55 generates signals in response to physical manipulation by a user and transmits those signals through bus 53 to processor 51.

The present invention also envisions other computing arrangements for the computer components, including processing on a single machine such as a mainframe, a collection of machines, over a network or the Internet, or other suitable means. Computing system 40 also includes an operating system (not shown). A person of ordinary skill in the art will understand that the storage/memory 52 may contain additional information, such as application programs, operating systems data, etc., which are not shown in the figure for the sake of clarity. It will also be understood that the computing system 40 (or any other data processing system used to implement the steps of the present invention) can also include additional elements not shown, such as additional data, software, and/or information in memory, disk drives, keyboards, display devices, network connections, additional memory, additional CPUs, LANs, input/output lines, etc.

It should be understood that the inventive program and method disclosed herein may be implemented in any appropriate operating system environment using any appropriate object-oriented programming language or programming technique.

Figure 2:
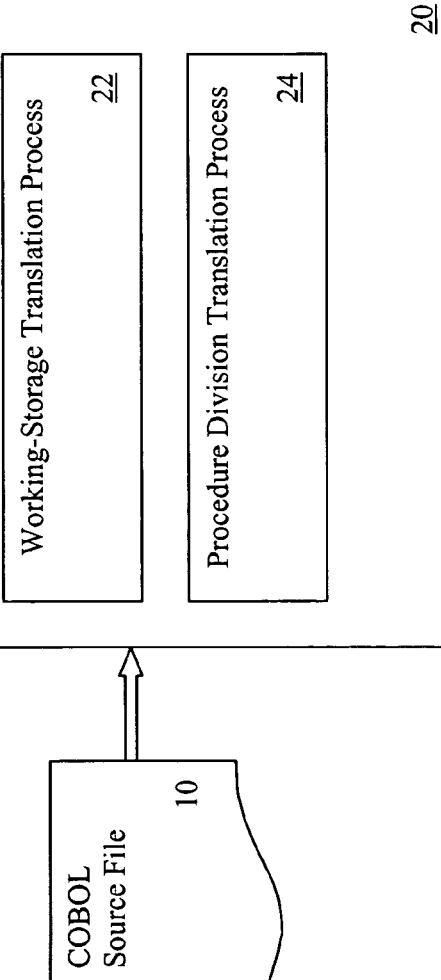
FIG. 2 depicts a block diagram of the source code translator of the present invention for translating a COBOL Source File/Source Code File into C++ Source Files.

Referring to FIG. 2, a block diagram illustrates an embodiment of the invention that can be implemented on any appropriate computing platform, including but not limited to computing system 40 of FIG. 1. The invention includes a method and code devices for translating source code shown herein as COBOL source code file 10. The COBOL source code file 10 is input to the Source Code Translator 20 which then converts the COBOL source code into C++ or any other object-oriented language in accordance with the aspects of the present invention.

Preferably, the Source Code Translator 20 operates in two parts: the Working-Storage Translation Process 22 and the Procedure Division Translation Process 24 which translate their respective parts of the COBOL code into C++ source code. The Source Code Translator 20 is used to expedite the translation of computer programs from the COBOL language into the C++ language. It translates each COBOL program, or program section or module into a new C++ class that is derived from the 'Working-Storage Buffer Class' (which in the present invention is named: CWsBuff) and therefore inherits all the functionality of this 'Working-Storage Buffer Class'. In addition, each COBOL procedure is translated to be a C++ member-function of the derived class. And, many of the simple COBOL commands can be automatically translated into a function call to one of the member-functions of the CWsBuff class.

The output of the Source Code Translator 20 is placed into C++ source code file 30. After Supplemental Translation 32, the C++ source code files will need to be compiled and linked to the CWsBuff Class 41 before it can be executed.

In a preferred embodiment, the portions of code that are not translated by the Source Code Translator 20 are written to the C++ source files 30 as C++ code "comments" for referencing during Supplemental Translation 32. By not automatically translating certain portions of code (such as embedded SQL, user-interface and file-access commands), the programmer is free to translate those portions 'by-hand' for their specific needs (libraries, operating-systems, platforms variations, etc).

The Working-Storage Buffer Class (CWsBuff)

By emulating the COBOL Working-Storage Section in an object-oriented program, the object-oriented program source code can be made to closely resemble the original COBOL source code as well as have a very clean syntax. This allows the object-oriented program source code to be kept in a highly maintainable and readable form after translation.

The following describes the Working-Storage Buffer Class (CWsBuff) and an example of how to use it as shown in Table 1.

The Working-Storage Buffer Class emulates COBOL's Working-Storage memory. (This memory is where all the COBOL variables are stored during the execution of a COBOL program.) This is accomplished by managing a list of data that describes each COBOL variable and by creating and managing the memory buffer used to store the contents of the variables. The member-functions of the CWsBuff class use the descriptions of variables in order to know how to access and manipulate the memory buffer. For example, if the description specified a customer name at starting memory location 56, length 25, type 'X' for AlphaNumeric; then the Get( ) member-function (when called upon) would use this information to retrieve 25 bytes from the memory buffer starting at memory location 56, append a null terminator for the C-style string and then return the customer name to the caller.

The Working-Storage Buffer Class is used by, first, creating a new C++ class that is derived from (child of) the CWsBuff class, thereby inheriting the data and functionality of the Working-Storage Buffer class. This new child class is to contain the functionality of the COBOL logic. The parent class (CWsBuff) through inheritance provides the ability to store and retrieve the data of the emulated variables during the execution of the converted COBOL logic.

Secondly, a list of structures must be defined to describe the COBOL variables. This list is passed to the member function: CWsBuff::Setup( ).

The Setup( ) function will then: 1. validate the data in the list. 2. calculate the starting position of where each variable should begin in the memory buffer. 3. accumulate the total length of the memory buffer needed; and 4. allocate and initialize the memory buffer.

Once this function sets up the Working-Storage Buffer successfully (indicated by a return status of TRUE), the other member functions of the CWsBuff class (See Table 6) may be called to access and manipulate the emulated variables.

TABLE 1

Example Of How The CWsBuff Class Is Used.

```
class CCblExample : public CWsBuff
{
public:
    CCblExample( ) { };
    ~CCblExample( ) { };
    BOOL    MainModule( CString &szLinkage );
};
//-------------------------------------------------------------
enum {
    WS_CUSTOMER_RECORD,
    WS_CUSTOMER_NAME,
    WS_CUSTOMER_ADDRESS,
    WS_CUSTOMER_CITY,
    WS_CUSTOMER_STATE,
    WS_CUSTOMER_ZIP,
    WS_LAST_ONE
};
WSBUFF_FIELDS    WsFields[ ] =
{
    01, WS_CUSTOMER_RECORD      ,'X',  0, 0, 0,    //LEN: 87
        02, WS_CUSTOMER_NAME    ,'X', 30, 0, 0,
        02, WS_CUSTOMER_ADDRESS ,'X', 30, 0, 0,
        02, WS_CUSTOMER_CITY    ,'X', 15, 0, "Metropolis",
        02, WS_CUSTOMER_STATE   ,'X',  2, 0, "KS",
        02, WS_CUSTOMER_ZIP     ,'X', 10, 0, "12345-1234",
    -1, -1, -1, -1, -1, 0
};
BOOL    CCblExample::MainModule( CString &szLinkage )
{
    if (!Setup( WsFields ))
        return FALSE;
    Put( WS_CUSTOMER_NAME       , "John Doe" );
    Put( WS_CUSTOMER_ADDRESS    , "123 Main Street" );
    szLinkage = Get( WS_CUSTOMER_RECORD );
    return TRUE;
}
```

In the above example, the CCblExample class is defined to be derived from the CWsBuff class. In other words, the CCblExample class is a child of the CWsBuff class.

The enum { } list is used to define the enumeration constants that will represent the COBOL variables or fields. WS_CUSTOMER_RECORD will have the value of 0, WS_CUSTOMER_NAME will have the value of 1, WS_CUSTOMER_ADDRESS will have the value of 2, etc.

These enumeration constants are then used to identify the COBOL variables/fields defined in the WsFields[ ] array. The WsFields[ ] array is generated from the COBOL's Working-Storage Section during the Working-Storage Translation Process 22. The code is designed so that the order of the enumeration is in the same order as they are used in the WsFields[ ] array and that the first enumeration constant has the value of 0—because the actual value of the enumeration constant is used to index the WsFields[ ] array by the member functions of the CWsBuff class. The member functions could alternately be written such that the member functions search for the appropriate enumeration constant that would allow them to be put in any order, but this alternative would occur at runtime and may slow down processing.

The WsFields[ ] array is used to define the COBOL variables or fields. Each element of the array is a structure that describes a variable or field. Given the variable/field from the example in Table 1:

02, WS_CUSTOMER_CITY ,'X', 15, 0, "Metropolis",

The first value '02' of the structure indicates the COBOL variable level and is used to define the relationships between the variables/fields.

The second value 'WS_CUSTOMER_CITY' is the enumeration constant, which in this case would have a value of 3. So this particular structure must be the fourth structure in the array so it can be located by the index value of 3 since C/C++ uses zero-based index arrays. If it is not the fourth structure, the Setup( ) function will detect it and pop-up an error message for the programmer.

The third value 'X' indicates the variable type. In the current implementation, this field is ignored and all variables are assumed alphanumeric. However alternate embodiments of the CWSBuff class can implement different variable types, such as 'X' for alphanumeric, 'N' for numeric, 'F' for floating-point, and 'number' for numeric with 'number' decimal places, as well as implement such types as packed-decimals, comp and binaries.

The fourth value '15' defines the length of the variable/field. For group level variables (variables that represent a group of variables such WS_CUSTOMER_RECORD in the Table 1 example), this value is set to 0. The Setup( ) function will calculate the lengths of the group level variables which are identified by having a length of 0.

The fifth value '0' is for an enumeration constant of a previously defined variable. This is like COBOL's REDEFINE clause and will make the variable occupy the same memory as of a previously defined variable. When this has a value of 0 instead of an enumeration constant, it is not a REDEFINE variable and the variable will simply occupy the next available space in memory. In this embodiment, this means that since the first variable is identified by a value of 0, it cannot be REDEFINED and only a COBOL variable that is not REDEFINED can be at the start of the Working-Storage Buffer. Alternate embodiments with additional programming of the CwsBuff class could modify this, as known by those skilled in the art.

The sixth value "Metropolis" defines the default value for the variable/field. The Setup( ) member-function uses this value to initialize the memory of variable/field. As this is just a default value for the variable, the variable can still be overwritten using the other member functions such as Put( ). If the value is 0, then the variable is initialized with spaces.

The function MainModule( ) of Table 1 performs as follows:

The WsFields[ ] array is passed to the Setup( ) function to setup the Working-Storage Buffer memory. If it fails, MainModule( ) returns with FALSE. If it succeeds, then the value "John Doe" is placed into the variable WS_CUSTOMER_NAME and the value "123 Main Street" is placed into the variable WS_CUSTOMER_ADDRESS. The whole customer address is then retrieved from variable WS_CUSTOMER_RECORD and placed into the CString szLinkage which was passed 'By Reference' so the caller of MainModule( ) can get the customer address. MainModule( ) then returns TRUE to indicate to the caller that it has successfully retrieved the customer address.

The Working-Storage Translation Process

Figure 3:
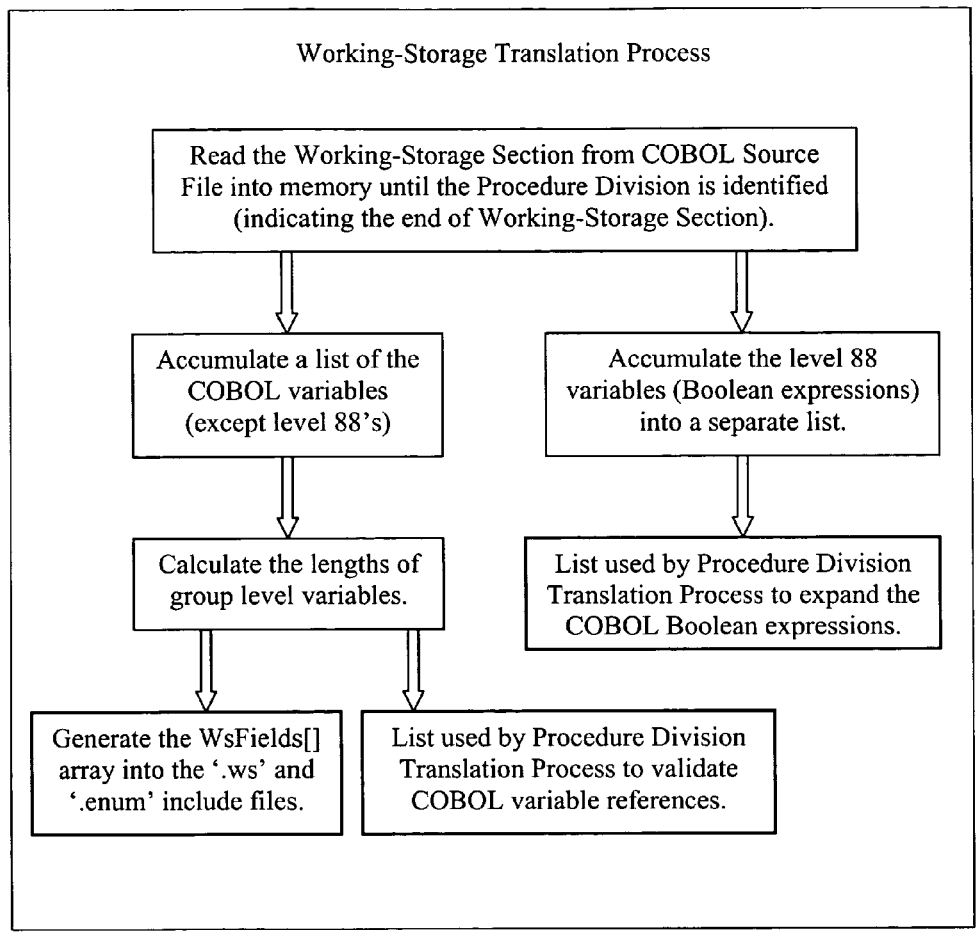
FIG. 3 depicts a block diagram of the basic tasks for the Working-Storage Translation Process in an embodiment of the invention.

Turning now to FIG. 3, an embodiment of the Working-Storage Translation Process will be described. In an embodiment of the present invention, the Working-Storage Translation Process 22 performs the following basic tasks:

The entire Working-Storage Section is read into memory before translation and a list of the COBOL variables are accumulated.

In COBOL, level 88 variables are used for Boolean expressions. They are accumulated in a separate list. This list is used to expand the Boolean expressions into conditional expressions when referenced in code.

The lengths of group level variables are calculated and are written as comments beside the variable. This is helpful in identifying group variables whose lengths mismatch in a redefines situation, in which case, a mismatch lengths error message is written as comments beside the variable.

When the COBOL command identifies the Procedure Division, this signifies the end of Working-Storage Section and then the variable list is used to generate the WsFields[ ] array into '.ws' include files and is also used to generate the '.enum' include files which will contain the enumeration constants for the WsFields[ ] array.

The Procedure Division Translation Process

When the Source Code Translator 20 identifies the Procedure Division, the translation process of the COBOL code is continued by the Procedure Division Translation Process 24.

Figure 4:
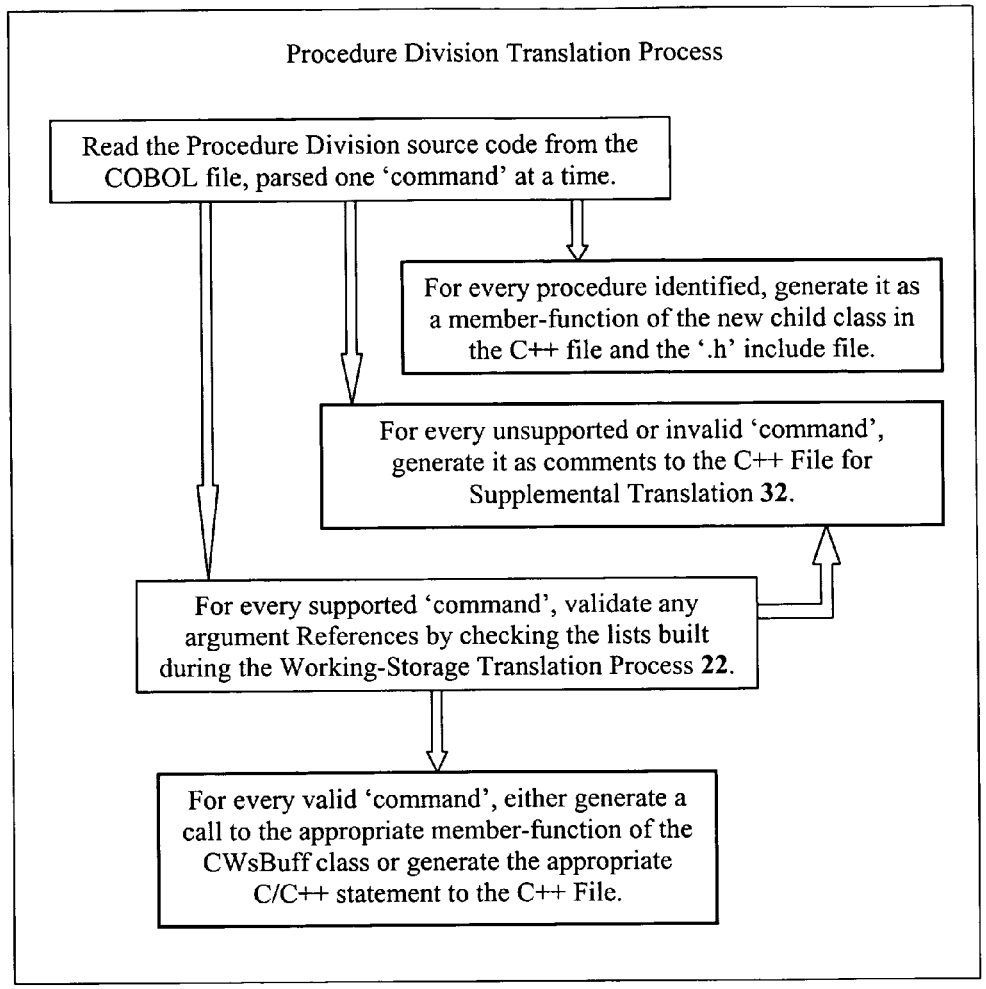
FIG. 4 depicts a block diagram of the basic tasks for the Procedure Division Translation Process in an embodiment of the invention.

Turning now to FIG. 4, an embodiment of the Procedure Division Translation Process will be described. In an embodiment of the present invention, the Procedure Division Translation Process 24 performs the following basic tasks:

When the COBOL command identifies a new procedure, a new procedure name is written to the C++ file as a member-function of the new child class, such as in the following, and is also written as the function prototype in '.h' include file for the class.

void <class name>::Cb1_<procedure name>( )
{

'PERFORM' commands are translated into function calls, such as in the following. If the COBOL command contains the 'VARYING' or 'UNTIL' clauses, then the original COBOL command is also written as comments following the function call so the programmer can later reference it in order to write the looping action part of the code.

Cb1_<procedure name>( ); //PERFORM <procedure name> UNTIL END-OF-FILE.

'MOVE' commands are translated into Put( ), Clear( ) or Copy( ) functions depending on the arguments in the command.

'IF' commands are translated into 'if (1)' C statements. The translator does not currently attempt to evaluate the expression, however alternate embodiments could. The original COBOL 'IF' command is written as comments following the 'if (1)' statement.

'COPY' and '++INCLUDE' commands are translated into '#include "<filename>"' statements.

References to the COBOL variables that occur during the translation of the COBOL commands are validated against the list of variables and the list of Boolean expressions that were accumulated during the Working-Storage Translation Process 22. If the Reference is a Boolean expression, it is expanded to it's conditional expression equivalent. If the Reference is not in either list, it is considered invalid and the COBOL command with the Reference is written to the C++ file as comments.

Certain COBOL commands may utilize Supplemental Translation 32 and are not translated by the Procedure Division Translation Process 24. Those COBOL commands not translated are written to the C++ file as comments for manual translation.

In an embodiment of the present invention, if embedded SQL code occurs in the COBOL code and specifies a cursor query, then the translator will generate a empty stub function for the programmer to fill in during Supplemental Translation 32, such as the following. However, this could be written alternatively to be handled in different ways.

```
void <class name>::Sq1_<cursor name>( )
{
}
```

Translated Code Samples

The following are samples of input and output source code files from the translation process. These samples should not be construed as limiting the application of the invention.

Table 2 shows a sample of a COBOL program's Working-Storage Section, and its equivalent C++ code, after translation, is shown in Table 3. Table 4 contains a sample COBOL program's Procedure Division, and its equivalent C++ code after translation is shown in Table 5.

TABLE 2

COBOL Source Code Fragment (Working-Storage Section).

| | |
|---|---|
| 01 CUSTOMER-RECORD-IN. | |
| 02 FILLER | PIC X(49). |
| 01 CUSTOMER-RECORD-OUT | PIC X(132). |
| WORKING-STORAGE SECTION. | |
| 01 CONTROL-FIELDS. | |
| 02 END-OF-FILE | PIC X VALUE "N". |
| 02 LINE-COUNT | PIC 9(2) VALUE 0. |
| 02 PAGE-COUNT | PIC 9(3) VALUE 0. |
| 01 WS-CUSTOMER-RECORD. | |
| 02 WS-CUSTOMER-NAME | PIC X(20). |
| 02 WS-CUSTOMER-SSN | PIC X(11). |
| 02 MS-CUSTOMER-CHECKING-BALANCE | PIC S9(8)V99. |
| 02 MS-CUSTOMER-SAVINGS-BALANCE | PIC S9(8)V99. |
| 01 WORKING-FIELDS. | |
| 02 WS-TOT-CUSTOMER-BALANCE | PIC S9(9)V99 VALUE 0. |
| 02 WS-TOT-CHECKING-BALANCE | PIC S9(9)V99 VALUE 0. |
| 02 WS-TOT-SAVINGS-BALANCE | PIC S9(9)V99 VALUE 0. |
| 02 WS-TOT-ALL-BALANCE | PIC S9(9)V99 VALUE 0. |
| 01 WS-DATE | PIC 9(6). |
| 01 DATE-HEADING. | |

TABLE 2-continued

COBOL Source Code Fragment (Working-Storage Section).

| | |
|---|---|
| 02 FILLER | PIC X(6) VALUE "DATE ". |
| 02 DATE-OUT | PIC 99/99/99. |
| 01 COLUMN-HEADING. | |
| 02 FILLER | PIC X(14) VALUE SPACES. |
| 02 FILLER | PIC X(8) VALUE "CUSTOMER". |
| 02 FILLER | PIC X(10) VALUE SPACES. |
| 02 FILLER | PIC X(12) VALUE "CUSTOMER SSN". |
| 02 FILLER | PIC X(10) VALUE SPACES. |
| 02 FILLER | PIC X(16) VALUE "CHECKING BALANCE". |
| 02 FILLER | PIC X(10) VALUE SPACES. |
| 02 FILLER | PIC X(15) VALUE "SAVINGS BALANCE". |
| 02 FILLER | PIC X(10) VALUE SPACES. |
| 02 FILLER | PIC X(13) VALUE "TOTAL BALANCE". |
| 01 DETAIL-LINE. | |
| 02 FILLER | PIC X(9) VALUE SPACES. |
| 02 CUSTOMER-NAME-OUT | PIC X(20). |
| 02 FILLER | PIC X(4) VALUE SPACES. |
| 02 CUSTOMER-SSN-OUT | PIC X(11). |
| 02 FILLER | PIC X(10) VALUE SPACES. |
| 02 CUSTOMER-CHECKING-BALANCE-OUT | PIC $ZZ, ZZZ, ZZ9.99+. |
| 02 FILLER | PIC X(10) VALUE SPACES. |
| 02 CUSTOMER-SAVINGS-BALANCE-OUT | PIC $ZZ, ZZZ, ZZ9.99+. |
| 02 FILLER | PIC X(10) VALUE SPACES. |
| 02 CUSTOMER-TOTAL-BALANCE-OUT | PIC $ZZ, ZZZ, ZZ9.99+. |
| 01 TOTAL-LINE. | |
| 02 FILLER | PIC X(46) VALUE SPACES. |
| 02 FILLER | PIC X(9) VALUE " TOTAL ". |
| 02 TOTAL-CHECKING-BALANCE-OUT | PIC $ZZZ, ZZZ, ZZ9.99+. |
| 02 FILLER | PIC X(10) VALUE SPACES. |
| 02 TOTAL-SAVINGS-BALANCE-OUT | PIC $ZZZ, ZZZ, ZZ9.99+. |
| 02 FILLER | PIC X(10) VALUE SPACES. |
| 02 TOTAL-ALL-ACCOUNT-BALANCE-OUT | PIC $ZZZ, ZZZ, ZZ9.99+. |

TABLE 3

C++ Source Code Fragment (Working-Storage Section) After Translation.

```
WSBUFF_FIELDS     WsFields[ ] =
{
  01, CUSTOMER_RECORD_IN                ,'X',   0, 0, 0,     //LEN: 49
    02, FILLER                          ,'X',  49, 0, 0,
  01, CUSTOMER_RECORD_OUT               ,'X', 132, 0, 0,
  01, CONTROL_FIELDS                    ,'X',   0, 0, 0,     //LEN: 6
    02, END_OF_FILE                     ,'X',   1, 0, "N",   //PIC: X
    02, LINE_COUNT                      ,'N',   2, 0, 0,
    02, PAGE_COUNT                      ,'N',   3, 0, 0,
  01, WS_CUSTOMER_RECORD                ,'X',   0, 0, 0,     //LEN: 53
    02, WS_CUSTOMER_NAME                ,'X',  20, 0, 0,
    02, WS_CUSTOMER_SSN                 ,'X',  11, 0, 0,
    02, WS_CUSTOMER_CHECKING_BALANCE    ,'2',  11, 0, 0,     //PIC: S9(8)V99
    02, WS_CUSTOMER_SAVINGS_BALANCE     ,'2',  11, 0, 0,     //PIC: S9(8)V99
```

TABLE 3-continued

C++ Source Code Fragment (Working-Storage Section) After Translation.

```
01, WORKING_FIELDS                       ,'X',  0, 0, 0,    //LEN: 48
  02, WS_TOT_CUSTOMER_BALANCE            ,'2', 12, 0, 0,    //PIC: S9(9)V99
  02, WS_TOT_CHECKING_BALANCE            ,'2', 12, 0, 0,    //PIC: S9(9)V99
  02, WS_TOT_SAVINGS_BALANCE             ,'2', 12, 0, 0,    //PIC: S9(9)V99
  02, WS_TOT_ALL_BALANCE                 ,'2', 12, 0, 0,    //PIC: S9(9)V99
01, WS_DATE                              ,'N',  6, 0, 0,
01, DATE_HEADING                         ,'X',  0, 0, 0,    //LEN: 14
  02, FILLER                             ,'X',  6, 0, "DATE ",
  02, DATE_OUT                           ,'N',  8, 0, 0,    //PIC: 99/99/99
01, COLUMN_HEADING                       ,'X',  0, 0, 0,    //LEN: 118
  02, FILLER                             ,'X', 14, 0, 0,
  02, FILLER                             ,'X',  8, 0, "CUSTOMER",
  02, FILLER                             ,'X', 10, 0, 0,
  02, FILLER                             ,'X', 12, 0, "CUSTOMER SSN",
  02, FILLER                             ,'X', 10, 0, 0,
  02, FILLER                             ,'X', 16, 0, "CHECKING BALANCE",
  02, FILLER                             ,'X', 10, 0, 0,
  02, FILLER                             ,'X', 15, 0, "SAVINGS BALANCE",
  02, FILLER                             ,'X', 10, 0, 0,
  02, FILLER                             ,'X', 13, 0, "TOTAL BALANCE",
01, DETAIL_LINE                          ,'X',  0, 0, 0,    //LEN: 119
  02, FILLER                             ,'X',  9, 0, 0,
  02, CUSTOMER_NAME_OUT                  ,'X', 20, 0, 0,
  02, FILLER                             ,'X',  4, 0, 0,
  02, CUSTOMER_SSN_OUT                   ,'X', 11, 0, 0,
  02, FILLER                             ,'X', 10, 0, 0,
  02, CUSTOMER_CHECKING_BALANCE_OUT      ,'$', 15, 0, 0,    //PIC: $ZZ,ZZZ,ZZ9.99+
  02, FILLER                             ,'X', 10, 0, 0,
  02, CUSTOMER SAVINGS_BALANCE_OUT       ,'$', 15, 0, 0,    //PIC: $ZZ,ZZZ,ZZ9.99+
  02, FILLER                             ,'X', 10, 0, 0,
  02, CUSTOMER_TOTAL_BALANCE_OUT         ,'$', 15, 0, 0,    //PIC: $ZZ,ZZZ,ZZ9.99+
01, TOTAL_LINE                           ,'X',  0, 0, 0,    //LEN: 123
  02, FILLER                             ,'X', 46, 0, 0,
  02, FILLER                             ,'X',  9, 0, " TOTAL        ",
  02, TOTAL_CHECKING_BALANCE_OUT         ,'$', 16, 0, 0,    //PIC: $ZZZ,ZZZ,ZZ9.99+
  02, FILLER                             ,'X', 10, 0, 0,
  02, TOTAL_SAVINGS_BALANCE_OUT          ,'$', 16, 0, 0,    //PIC: $ZZZ,ZZZ,ZZ9.99+
  02, FILLER                             ,'X', 10, 0, 0,
  02, TOTAL_ALL_ACCOUNT_BALANCE_OUT      ,'$', 16, 0, 0,    //PIC: $ZZZ,ZZZ,ZZ9.99+
-1, -1, -1, -1, -1, 0
};
```

TABLE 4

COBOL Source Code Fragment (Procedure Division).

```
B100-INITIALIZE-PROCESSING.
   OPEN   INPUT CUSTOMER-FILE-IN
          OUTPUT CUSTOMER-FILE-OUT.
   PERFORM X100-READ-DATA.
B200-GET-DATE.
   ACCEPT WS-DATE FROM DATE.
   MOVE WS-DATE TO DATE-OUT.
B300-PROCESS-DATA.
   IF LINE-COUNT EQUAL TO 0 OR GREATER THAN 56 THEN
      PERFORM X200-WRITE-REPORT-HEADING.
   PERFORM C100-CALC-CUSTOMER-BALANCE.
   PERFORM X300-WRITE-DATA.
   PERFORM X100-READ-DATA.
B400-TERMINATE-PROCESSING.
   MOVE WS-TOT-CHECKING-BALANCE TO TOTAL-CHECKING-
   BALANCE-OUT.
   MOVE WS-TOT-SAVINGS-BALANCE TO TOTAL-SAVINGS-
   BALANCE-OUT.
   MOVE WS-TOT-ALL-BALANCE TO TOTAL-ALL-ACCOUNT-
   BALANCE-OUT.
   WRITE   CUSTOMER-RECORD-OUT FROM TOTAL-LINE
           AFTER ADVANCING 3.
   CLOSE   CUSTOMER-FILE-IN
           CUSTOMER-REPORT-FILE.
X300-WRITE-DATA.
   MOVE WS-CUSTOMER-NAME TO CUSTOMER-NAME-OUT.
   MOVE WS-CUSTOMER-SSN TO CUSTOMER-SSN-OUT.
   MOVE WS-CUSTOMER-CHECKING-BALANCE TO
      CUSTOMER-CHECKING-BALANCE-OUT.
   MOVE WS-CUSTOMER-SAVINGS-BALANCE TO
      CUSTOMER-SAVINGS-BALANCE-OUT.
   MOVE WS-TOT-CUSTOMER-BALANCE TO CUSTOMER-TOTAL-
   BALANCE-OUT.
   WRITE CUSTOMER-RECORD-OUT
         FROM DETAIL-LINE.
   ADD   1 TO LINE-COUNT.
```

TABLE 5

C++ Source Code Fragment (Procedure Division) After Translation.

```
void    CTest::Cbl_B100_Initialize_Processing( )
{
// OPEN INPUT CUSTOMER_FILE_IN OUTPUT
CUSTOMER_FILE_OUT .
   Cbl_X100_Read_Data ( );
}
void    CTest::Cbl_B200_Get_Date( )
{
// ACCEPT WS_DATE FROM DATE .
   Copy( DATE_OUT                , WS_DATE );
}
```

TABLE 5-continued

C++ Source Code Fragment (Procedure Division) After Translation.

```
void     CTest::Cbl_B300_Process_Data( )
{
if (1) //IF LINE_COUNT EQUAL TO 0 OR GREATER THAN 56
THEN
    {
        Cbl_X200_Write_Report_Heading( );
    }
    Cbl_C100_Calc_Customer_Balance( );
    Cbl_X300_Write_Data( );
    Cbl_X100_Read_Data( );
}
void     CTest::Cbl_B400_Terminate_Processing( )
{
    Copy( TOTAL_CHECKING_BALANCE_OUT,
    WS_TOT_CHECKING_BALANCE );
    Copy( TOTAL_SAVINGS_BALANCE_OUT,
    WS_TOT_SAVINGS_BALANCE );
    Copy( TOTAL_ALL_ACCOUNT_BALANCE_OUT,
    WS_TOT_ALL_BALANCE );
// WRITE CUSTOMER_RECORD_OUT FROM TOTAL_LINE
    AFTER ADVANCING 3 .
// CLOSE CUSTOMER_FILE_IN CUSTOMER_REPORT_FILE .
}
void     CTest::Cbl_X300_Write_Data( )
{
    Copy( CUSTOMER_NAME_OUT    , WS_CUSTOMER_NAME );
    Copy( CUSTOMER_SSN_OUT     , WS_CUSTOMER_SSN );
    Copy( CUSTOMER_CHECKING_BALANCE_OUT,
    WS_CUSTOMER_CHECKING_BALANCE );
    Copy( CUSTOMER_SAVINGS_BALANCE_OUT,
    WS_CUSTOMER_SAVINGS_BALANCE );
    Copy( CUSTOMER_TOTAL_BALANCE_OUT,
    WS_TOT_CUSTOMER_BALANCE );
// WRITE CUSTOMER_RECORD_OUT FROM DETAIL_LINE .
// ADD 1 TO LINE_COUNT   .
}
```

TABLE 6

Member Functions Of CWsBuff Class.

```
class CWsBuff
{
public:
    BOOL    Setup( WSBUFF_FIELDS *pFields );
    // GET VALUE FUNCTIONS:
    LPSTR   GetTrim( int nField );
    LPSTR   Get( int nField );
    LPSTR   Get( int nField, LPSTR szField );
    LPSTR   Get( int nField, CString& cszField );
    char    GetCh( int nField, int nPos = 1 );
    int     GetNum( int nField );
    double  GetReal( int nField );
    double  GetReal( int nField, int nImpliedDecimals );
    // PUT VALUE FUNCTIONS:
    void    Put( int nField, LPSTR szField );
    void    Put( int nField, CString& cszField );
    void    Put( int nField, char chValue, int nPos = 1 );
    void    Put( int nField, int nValue );
    void    Put( int nField, double nValue );
    void    Put( int nField, double nValue, int nImpliedDecimals );
    void    PutFloat( int nField, LPSTR szField );
    void    Copy( int nDstField, int nSrcField );
    void    AddTo( int nField, int nValue );
    void    AddTo( int nField, double nValue );
    void    Clear( int nField );
    // TEST VALUE FUNCTIONS:
    BOOL    IsSpaces( int nField );
    BOOL    IsZero( int nField );
    BOOL    IsNumeric( int nField );
    BOOL    IsEqual( int nLField, int nRField );
    BOOL    IsEqualTo( int nField, LPSTR szValue );
    BOOL    IsEqualTo( int nField, char chValue );
    BOOL    IsEqualTo( int nField, int nValue );
```

TABLE 6-continued

Member Functions Of CWsBuff Class.

```
    BOOL    IsEqualTo( int nField, double nValue );
    void    RightJustify(    int nField );
    void    FormatNumber(    int     nField,
                             int     nDecimals       = 0,
                             int     nLeadingZeros   = 0,
                             BOOL    bSpaceWhenZero  = TRUE,
                             BOOL    bCommas         = FALSE,
                             LPSTR   szPrefix        = NULL,
                             BOOL    bLeftJustify    = FALSE );
    void    ReplaceKeyColumns( CString &szStr, int nKeys[ ]   );
};
```

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer subsystem embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

It should be understood that the examples and embodiments described herein are for illustrative purposes only and that various modifications or changes in light thereof will be suggested to persons skilled in the art and are to be included within the spirit and purview of the claims.

What is claimed is:

1. A method recordable as software code executable on a computer for creating, in an object-oriented program, an object class that emulates a Working Storage section of a COBOL program, the method comprising the step of:
   creating a base class in object-oriented source code, said base class comprising functions for creating a memory buffer to store variables representative of the COBOL's Working-Storage section and for accessing the memory buffer.

2. The method of claim 1, wherein the functions for creating a memory buffer comprise code for validating a list of variable descriptions representative of the COBOL's Working-Storage section.

3. The method of claim 2, wherein the functions for creating a memory buffer comprise code for calculating a starting position in the memory buffer for each variable description.

4. The method of claim 3, wherein the functions for creating a memory buffer comprise code for accumulating the length of the memory buffer.

5. The method of claim 4, wherein the functions for creating a memory buffer comprise code for allocating the memory buffer.

6. The method of claim 5, wherein the functions for creating a memory buffer comprise code for initializing the memory buffer.

7. The method of claim 1, wherein the functions for accessing the memory buffer comprise code for retrieving variables from the memory buffer.

8. The method of claim 1, wherein the functions for accessing the memory buffer comprise code for storing variables in the memory buffer.

9. A method of emulating in an object-oriented program a COBOL Working-Storage section, the method comprising:
   (a) creating a child class derived from a base class, wherein the base class comprises functions for creating a memory buffer to store variables representative of the COBOL's Working-Storage section and for accessing the memory buffer;
   (b) defining enumeration constants to represent the variables of the COBOL's Working-Storage section;
   (c) creating a list to describe the COBOL variables;
   (d) calling functions of the base class to create the memory buffer; and
   (e) calling functions of the base class to access the memory buffer.

10. The method of claim 9, wherein the list is implemented as an array of structures.

11. The method of claim 9, wherein the list is passed to the functions for creating the memory buffer.

12. A method of translating COBOL source code into an object-oriented source code, comprising:
   (a) reading in the COBOL source code, including COBOL commands;
   (b) generating a child class in object-oriented source code, the child class derived from a base class, wherein the base class emulates COBOL's Working-Storage section;
   (c) generating in object-oriented source code a list of variable descriptions corresponding to the COBOL's Working-Storage section source code;
   (d) generating in object-oriented source code a function call for calling the base class, and passing to the base class the list of variable descriptions, for creating and initializing the memory buffer;
   (e) generating in object-oriented source code a member function of the child class for each COBOL procedure identified;
   (f) generating in object-oriented source code functions calls to the base class for at least one of the COBOL commands read in.

13. The method of claim 12, wherein the list of variable descriptions is implemented as an array of structures.

14. An object base class of executable code in an object-oriented program recordable on computer readable media for emulating COBOL's Working-Storage section, comprising:
   at least one function for creating a memory buffer to store variables representative of the COBOL's Working-Storage section; and
   at least one function for accessing the memory buffer.

15. The class of executable code of claim 14, wherein the function for creating a memory buffer comprises code for validating a list of variable descriptions representative of the COBOL's Working-Storage section.

16. The class of executable code of claim 15, wherein the function for creating a memory buffer comprises code for calculating a starting position in the memory buffer for each variable description.

17. The class of executable code of claim 16, wherein the function for creating a memory buffer comprises code for accumulating the length of the memory buffer.

18. The class of executable code of claim 17, wherein the function for creating a memory buffer comprise code for allocating the memory buffer.

19. The class of executable code of claim 18, wherein the function for creating a memory buffer comprises code for initializing the memory buffer.

20. The class of executable code of claim 14, wherein the function for accessing the memory buffer comprises code for retrieving variables from the memory buffer.

21. The class of executable code of claim 14, wherein the function for accessing the memory buffer comprises code for storing variables in the memory buffer.

22. An emulated COBOL's Working-Storage section of executable code in an object-oriented program recordable on computer readable media, comprising:
   a base class in object-oriented source code;
   a memory buffer created from a list, passed in from a function call of the base class; wherein the list describes each of the variables representative of the COBOL's Working-Storage section; and
   a function call from the base class to access the memory buffer.

23. A program product for translating COBOL source into an object-oriented source code, comprising:
   a storage medium; and
   a translator stored in said storage medium, said translator configured to perform the following steps:
   (a) reading in the COBOL source code, including COBOL commands;
   (b) generating a child class in object-oriented source code, the child class derived from a base class, wherein the base class emulates COBOL's Working-Storage section;
   (c) generating in object-oriented source code a list of variable descriptions corresponding to the COBOL's Working-Storage section source code;
   (d) generating in object-oriented source code a function call to the base class, passing in the list of variable descriptions, for creating and initializing the memory buffer;
   (e) generating in object-oriented source code a member function of the child class for each COBOL procedure identified;
   (f) generating in object-oriented source code functions calls to the base class for at least one of the COBOL commands read in.

24. A program product for emulating in an object-oriented program a COBOL's Working Storage section, comprising:
   a storage medium; and
   code stored in said storage medium, said code configured to perform the following steps:

(a) reading in the COBOL source code, including COBOL commands;
(b) accumulating a list of variable descriptions corresponding to the COBOL's Working-Storage section source code;
(c) creating an instant of a class, including functions, that emulates the COBOL's Working-Storage section;
(d) calling functions of the class and passing to them the list, for creating and initializing a memory buffer;
(e) calling appropriate function of the class as each COBOL source code command is read in.

* * * * *